Aug. 18, 1942.   R. D. MERSHON   2,293,657
ELECTROLYTIC CONDENSER AND FORMATION OF ANODE FILMS
Filed Dec. 6, 1930
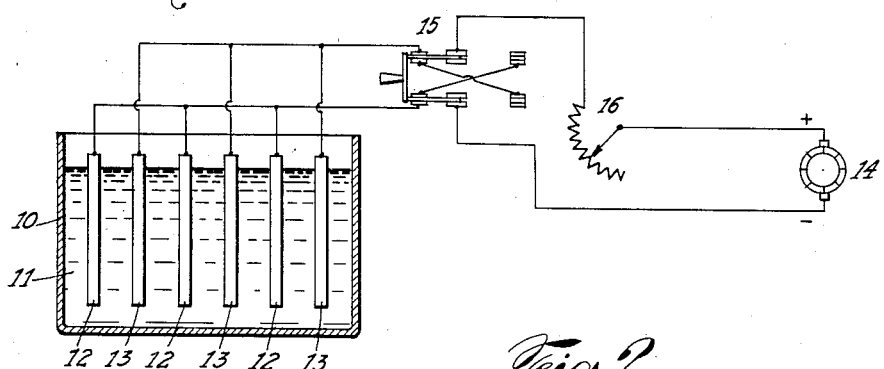
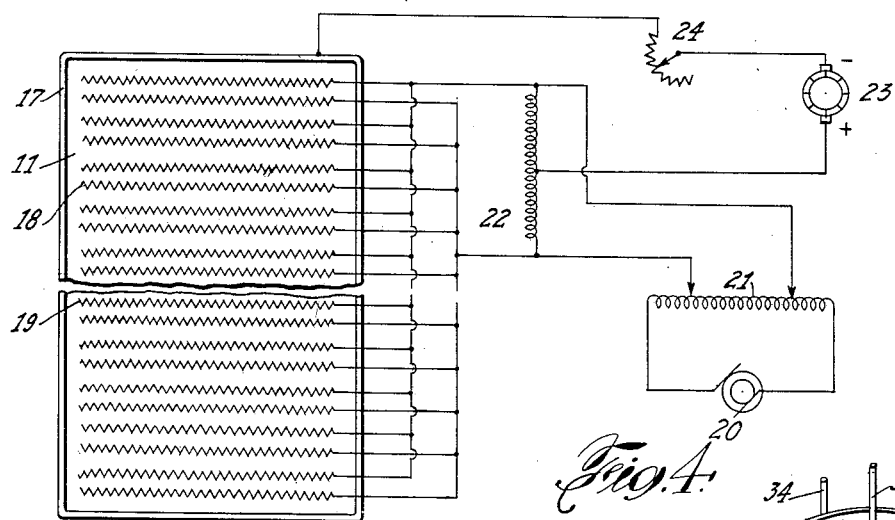
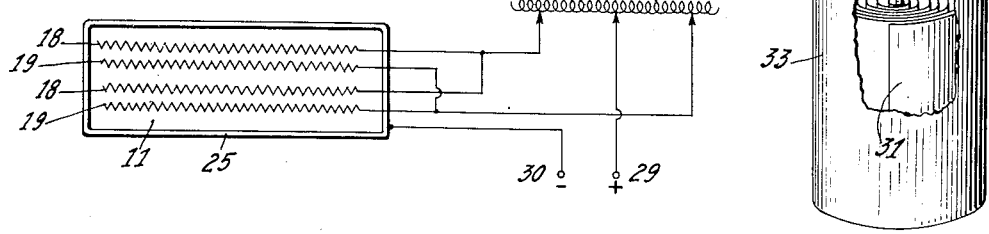
INVENTOR
Ralph D. Mershon
BY his ATTORNEYS
Cooper, Kerr & Dunham Patented Aug. 18, 1942

2,293,657

UNITED STATES PATENT OFFICE 2,293,657

ELECTROLYTIC CONDENSER AND FORMATION OF ANODE FILMS

Ralph D. Mershon, New York, N. Y.

Application December 6, 1930, Serial No. 500,497

8 Claims. (Cl. 175—315)

In the use of electrolytic condensers one of the most important features to be considered is the power factor, since it is upon this that the efficiency of the condenser depends, and it is well known that condensers which appear to be otherwise exactly alike often differ markedly in power factor, one having a low power factor and high efficiency and another a high power factor and correspondingly low efficiency, even when connected in parallel on the same circuit. I have found, however, that if the electrolyte contains, in addition to the compound or compounds commonly used, a substantial amount of colloidal aluminum hydroxid, a low power factor can be obtained, both in the formation of the films and in the subsequent operation of the condenser. I have also found that the power factor of the condenser will remain substantially constant at the low initial value. Thus if the electrolyte in which the anodes are immersed to form the films contains colloidal hydroxid, the power factor is at first high, as is usual, but it falls rapidly to a low value and the films are fully formed in a shorter time.

For the best results the colloidal hydroxid should be free from chlorids and sulfates. I have found that colloidal hydroxid of the desired purity can be readily produced by the electrolytic effect of passing current, preferably unidirectional, between one or more aluminum electrodes through the electrolyte, which latter may be of the common borax type, say one containing one-half pound of borax and one and a half pounds of boric acid per gallon of water. The electrolyte may be hot or cold but the formation of the colloid is more rapid in a hot electrolyte and accordingly I prefer to have the same boiling. The voltage preferably unidirectional, need not be high, and I prefer to start with a voltage which will give an initial current density of about 400 milliamperes per square foot of electrode surface. Films are of course formed on the positive electrode or electrodes and as the film builds up on the latter the current decreases, and when the current has fallen to a density of about 200 milliamperes, that is, about half the initial value, I reverse the voltage, connecting the filmed electrodes to the negative side of the source and the unfilmed electrodes to the positive side. This connection is maintained until the current has fallen as before. Repeating this operation, there is formed in the electrolyte a transparent starch-like compound which is identified as colloidal aluminum hydroxid, usually slightly bluish in color. Eventually a white or slightly yellowish precipitate begins to form which appears to be non-colloidal aluminum hydroxid and indicates that formation of the colloid has ceased or is proceeding very slowly.

Removing the colloid-forming electrodes from the electrolyte (which contains the colloidal hydroxid) I immerse the unfilmed condenser anodes therein and form the necessary films in any suitable and convenient manner, for example as described in my prior patents, No. 1,012,889, No. 1,065,704, or No. 1,388,874, the electrolyte being preferably boiling. At first the power factor is quite high, as usual, but falls rapidly, in some cases reaching its end value (indicating that the films are fully formed) in about one-fourth of the time ordinarily required. If the apparatus is now operated as a condenser the power factor will not only be low initially but will remain so.

Alternatively, the condenser films may be formed in a "raw" electrolyte to which a suitable amount of the colloidal aluminum hydroxid has been added, say three-fourths of an ounce per gallon, and the anodes so filmed may be used in a raw electrolyte to which a like amount of colloidal aluminum hydroxid has been added. I prefer the method first described, however, since the filtering out and washing of the colloid may involve more or less loss thereof, especially the smaller particles. In either case the effect of the colloidal material upon the power factor of the condenser is pronounced, giving a consistently lower value than is obtainable without such material, and moreover these lower values are substantially constant. For example a condenser in continuous operation for more than three thousand hours still shows a power factor of 4.3 per cent. Other condensers, with electrolytes containing less of the colloid, show power factors between 5 and 6 per cent.

In the production of the colloid better results are obtained with low current density, and I therefore prefer that it should not greatly exceed about 400 milliamperes per square foot when using direct current. With alternating current a current density of 475 to 500 milliamperes has been found satisfactory. It is difficult to determine by weight the amount of the colloid formed, because of the virtual impossibility of filtering without loss, and the uncertainty as to the amount of water held by the colloid when drained. I therefore prefer to control the operation by varying the ampere-hours of colloid formation. For example, starting with raw electrolytes containing borax and boric acid in the proportions stated above, the colloid-forming operation may be carried on for different periods with the same or different current densities. In this way I have found that with direct current an electrolyte treated as described for about fourteen and a half ampere-hours per gallon gives excellent results both for formation of the condenser films and for subsequent use in the condenser. In practice a large volume of electrolyte can be treated and a large number of anodes, sufficient for a number of condensers, can be filmed therein, after which the treated electrolyte can be divided up for use in the several condensers.

Referring to the accompanying drawing, in which the operations above described are illustrated diagrammatically:

Fig. 1 is a cross section illustrating the treatment of the electrolyte with direct current for the formation of the colloidal aluminum hydroxid:

Fig. 2 is a plan view illustrating the formation of the films on the condenser anodes by the method described and claimed in my above-mentioned prior Patent No. 1,388,874, issued August 30, 1921;

Fig. 3 is a plan view illustrating an excited condenser having four anodes;

Fig. 4 is a perspective view of a condenser having a single anode of the spiral type.

In Fig. 1, 10 represents a tank or vessel, preferably of copper, containing the electrolyte 11 in which are immersed a convenient number of aluminum plates 12, 13, connected to a source of direct current, for example a generator 14, through a reversing switch 15 by which either group of plates can be connected with the positive or negative terminal of the generator at will, and through a rheostat 16 by which the voltage and current impressed on the plates can be varied as desired. External heating means, not shown, may be employed to heat the electrolyte if the electrical losses are not sufficient to maintain the desired temperature.

After the electrolyte has been treated for the proper time the aluminum plates 12, 13 can be removed and the condenser anodes which are to be filmed immersed in the treated electrolye, or the electrolyte can be transferred to another tank or vessel 17, Fig. 2. In this figure the sheet aluminum anodes 18, 19, are shown as of the crimped or corrugated type, and are connected in groups to a source of alternating voltage and current 20 through a transformer 21. Across the A. C. leads between the anodes and the transformer is a balance coil 22, connected at its neutral point to the positive side of a source of direct voltage and current 23. The negative side of the latter is connected through a rheostat 24 to the copper tank which thus serves as a cathode. The formation of the films is begun by impressing a low unidirectional "exciting" voltage on the anodes, thus forming or partially forming the films up to that voltage, and while the direct voltage is still impressed, alternating voltage is also impressed, at a value sufficiently below the direct voltage to insure that the anodes never become negative with respect to the electrolyte,—that is, to insure that the film stress on the anodes will always be positive. As the formation of the films proceeds, both voltages are raised, gradually or step by step, keeping the direct voltage high enough to prevent reversal of film stress, until the formation is completed. As before stated, it is desirable to "form" the anodes with the electrolyte hot, and if the internal electrical losses are not sufficient to effect the heating, which should preferably be sufficient to bring the electrolyte to boiling before the formation is completed, the necessary additional heat can be supplied from an external source, not shown.

The condenser shown in Fig. 3 comprises a tank 25, preferably of copper, containing some of the treated electrolyte 11, and four of the anodes 18, 19. The latter are connected to an autotransformer 26 having A. C. terminals 27, 28. The transformer connections are shown as variable to permit a desired variation of the impressed alternating voltage when the condenser is in use. The condenser is also provided with terminals 29, 30 for connection with a suitable source of exciting voltage and current, not shown, terminal 29 being connected to the neutral point of the autotransformer and the other to the copper tank 25, which serves as the condenser cathode.

If the condenser is to have a single anode, as is commonly the case in "smoothing" condensers employed in radio filter circuits, I prefer the construction shown in Fig. 4, in which the anode 31 is made of uncorrugated sheet aluminum wound spirally around an aluminum rod 32 which serves as the positive terminal of the condenser. The electrolyte, in which the anode is immersed, is contained in a copper can 33 serving as the condenser cathode and having a terminal 34.

It is to be understood that the invention is not limited to the specific details herein described but can be carried out in other ways without departure from its spirit.

Nor do I intend the claims to be limited to a condenser having a plurality of anodes, since the invention is also advantageous in one-anode condensers.

I claim:

1. The method of forming and operating electrolytic condensers having aluminum anodes to obtain and maintain a low power factor, comprising immersing aluminum plates in a hot film-forming electrolyte containing a boron compound, passing direct current from plate to plate through the electrolyte with an initial current density of about 400 milliamperes per square foot of plate surface and until the current density has decreased to a lower value of about 200 milliamperes, then reversing the direction of current flow until the current density has again fallen to the said lower value, and repeating such steps for from 14 to 15 ampere-hours per gallon of electrolyte; immersing aluminum anodes in the said electrolyte and forming films on the anodes while so immersed by passing current from the anodes to the electrolye; immersing the anodes so filmed in a suitable amount of said electrolyte; and thereafter operating the anodes and electrolyte as a condenser.

2. The method of forming films on anodes for electrolytic condensers, comprising passing direct current between aluminum plates immersed in a film-forming electrolyte containing a boron compound with a current density between about 400 and 200 milliamperes for about fourteen and a half ampere-hours per gallon of electrolyte and thereafter forming films on the anodes while the same are immersed in said electrolyte.

3. The method of obtaining and maintaining a low power factor in electrolytic condensers having aluminum anodes, comprising forming colloidal aluminum hydroxid in an electrolyte containing boric acid and borax, by passing current through said electrolyte between aluminum plates exposed thereto, thereafter immersing unfilmed anodes in a boric acid-borax electrolyte containing such hydroxid, forming films on the anodes when so immersed, and thereafter using the anodes in a boric acid-borax electrolyte containing such hydroxid.

4. The method of forming films on anodes for electrolytic condensers, comprising preparing electrolyte capable of providing a low power factor for condenser anodes, when later used in a condenser, which have been formed in such electrolyte, by passing current through a film forming electrolyte comprising borax and boric acid, between aluminum elements exposed to the said film forming electrolyte, and thereafter immersing unfilmed condenser anodes in electrolyte so prepared and electrolytically forming films on said anodes while the same are immersed in said electrolyte.

5. The method of forming and operating electrolytic condensers having aluminum anodes to obtain a low power factor, comprising treating a film forming electrolyte of a weak acid and a salt of a weak acid by passing current through said electrolyte, between aluminum elements exposed thereto, immersing the anodes in electrolyte so treated, forming films on the anodes while so immersed, and thereafter using the anodes in a condenser having electrolyte so treated.

6. The method of forming and operating electrolytic condensers having aluminum anodes to obtain a low power factor, comprising treating a film-forming electrolyte containing borax and boric acid by passing current through said electrolyte between aluminum elements exposed thereto, immersing the anodes in the treated electrolyte, forming films on the anodes while so immersed, and thereafter using the anodes in a condenser having the treated electrolyte.

7. The method of forming and operating electrolytic condensers having aluminum anodes, comprising treating a film forming electrolyte comprising a weak acid and a salt of a weak acid to provide for attainment of a low power factor in a condenser having such electrolyte and having anodes formed in such electrolyte, by passing current through the said film forming electrolyte between aluminum elements exposed thereto, immersing the aluminum anodes in the treated electrolyte, and completing preparation of a condenser comprising said anodes and the said electrolyte in which they are immersed, by forming films on the anodes while immersed in said treated electrolyte.

8. The method of forming and operating electrolytic condensers having aluminum anodes, comprising treating a film forming electrolyte comprising borax and boric acid to provide for attainment of a low power factor in a condenser having such electrolyte and having anodes formed in such electrolyte, by passing direct current through the said film forming electrolyte between aluminum elements exposed thereto, immersing the aluminum anodes in the treated electrolyte, and completing preparation of a condenser comprising said anodes and the said electrolyte in which they are immersed, by electrolytically forming films on the anodes while immersed in said treated electrolyte.

RALPH D. MERSHON.